US012564190B2

(12) United States Patent
Wegria et al.

(10) Patent No.: US 12,564,190 B2
(45) **Date of Patent: *Mar. 3, 2026**

(54) BIOBASED HERBICIDE ENHANCER AGENT AND METHOD FOR USING THE SAME

(71) Applicant: FYTEKO SA, Anderlecht (BE)

(72) Inventors: Guillaume Wegria, Anderlecht (BE); Juan Carlos Cabrera, Anderlecht (BE); Etienne Defoin, Anderlecht (BE)

(73) Assignee: FYTEKO SA, Anderlecht (BE)

( * ) Notice: Subject to any disclaimer, the term of this patent is extended or adjusted under 35 U.S.C. 154(b) by 198 days.

This patent is subject to a terminal disclaimer.

(21) Appl. No.: 18/685,496

(22) PCT Filed: Aug. 26, 2022

(86) PCT No.: PCT/EP2022/073761
§ 371 (c)(1),
(2) Date: Feb. 21, 2024

(87) PCT Pub. No.: WO2023/025930
PCT Pub. Date: Mar. 2, 2023

(65) Prior Publication Data
US 2024/0349721 A1        Oct. 24, 2024

(30) Foreign Application Priority Data
Aug. 27, 2021    (BE) .................................. 2021/5678

(51) Int. Cl.
*A01N 37/38*        (2006.01)
*A01P 13/00*        (2006.01)

(52) U.S. Cl.
CPC .............. *A01N 37/38* (2013.01); *A01P 13/00* (2021.08)

(58) Field of Classification Search
CPC ................................ A01N 37/38; A01P 13/00
See application file for complete search history.

(56) References Cited

U.S. PATENT DOCUMENTS

| | | |
|---|---|---|
| 4,808,208 A | 2/1989 | Lee et al. |
| 10,342,228 B2 | 7/2019 | Van Der Krieken et al. |
| 2011/0065579 A1 | 3/2011 | Sievernich et al. |

FOREIGN PATENT DOCUMENTS

| | | |
|---|---|---|
| CN | 103004761 A | 4/2013 |
| CN | 106565469 A | 4/2017 |
| CN | 111018697 A | 4/2020 |
| JP | 2002003386 A | 1/2002 |
| WO | 9956546 A1 | 11/1999 |

OTHER PUBLICATIONS

WIPO, ISR for PCT/EP2022/073761, Dec. 16, 2022.

*Primary Examiner* — Trevor Love
(74) *Attorney, Agent, or Firm* — Hodgson Russ LLP

(57)        ABSTRACT

The current invention relates to a herbicide enhancer agent for enhancing the efficiency of herbicides, comprising a polymer of a hydroxycinnamic acid with an average molecular mass higher than 400 g/mol. The invention also relates to a herbicidal formulation comprising: a herbicide and a polymer, wherein, the polymer is a polymer of a hydroxycinnamic acid with an average molecular mass higher than 400 g/mol, and the weight ratio of the herbicide to the polymer is between 1:10 and 1000:1. The invention also relates to the use of said formulation. The invention furthermore relates to a method for controlling weeds or for aiding harvest (desiccant).

15 Claims, 2 Drawing Sheets

BIOBASED HERBICIDE ENHANCER AGENT AND METHOD FOR USING THE SAME

FIELD OF THE INVENTION

Figure 1:
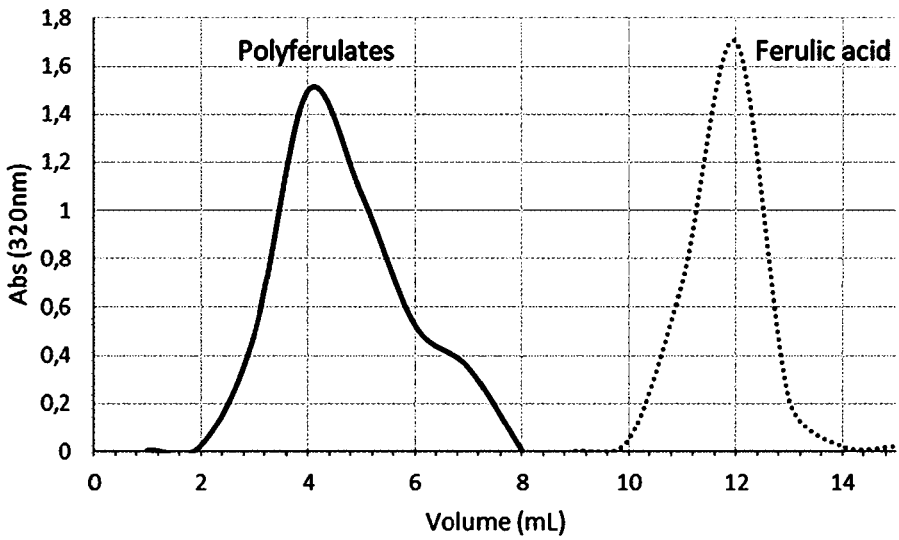

The present invention relates to a herbicide enhancer agent.

In a second aspect, the present invention relates to a herbicidal formulation.

In a third aspect, the present invention also relates to a method for the control of broad-leaved weeds and grasses in a variety of crops, and industrial vegetation or crop management (defoliant and desiccant aiding harvest) whereby said herbicidal formulation is applied in an herbicidally effective amount.

In another aspect, the present invention also relates to a use of said herbicidal formulation.

BACKGROUND

Weeds cost farmers billions of dollars annually in crop losses and the expense of efforts to keep weeds under control. The losses caused by weeds in agricultural production environments comprise decreases in crop yield, reduced crop quality, increased irrigation costs, increased harvesting costs, decreased land value, injury to livestock, and crop damage from insects and diseases harboured by the weeds. Chemical herbicides have provided an effective method of weed control over the years. Herbicides can generally be applied all year round to reduce problems caused by weeds.

There is a need for a composition that reduces the amount of herbicide necessary to obtain sufficient weed control while minimizing the harm to crop plants. As more weeds become resistant to herbicides, alternative compositions with high weed control are desired. Further, as no-till farming continues to increase in popularity, there is a greater need for effective herbicides. A composition with effective weed control and lower dosage rate will lead to increased crop plant yields, and decreased environmental, human, and mammalian health concerns.

Researchers try to find synergism between herbicides, to reduce the amount of herbicide necessary. U.S. Pat. No. 2,011,065 579 discloses many mixtures of herbicides. ES 2 713 176 describes the herbicide Florpyrauxifen. When mixed with an ammonium glyphosate, it is claimed that its properties are enhanced.

CN 111 018 697 describes a plant extracted herbicide. The invention discloses a method for extracting trans-p-hydroxycinnamic acid from corn stalks and application as a herbicide. The method comprises extraction with ethanol and ethyl acetate and a chromatographic column separation.

U.S. Pat. No. 10,342,228 describes a composition for biocide enhancement, comprising a polyelectrolyte complex of a polyanion and a polycation, and at least one biocide. The polyelectrolyte complex provides a synergistic effect to said biocide. In a preferred composition lignosulfonate is mixed with chitosan. Anti-oxidants, surfactants, waxes, stabilizers, and thickening products can also be added to the composition.

JP 2002 003 386 describes an animal cell cyclic amp level increasing agent or cyclic nucleotide phosphodiesterase inhibitor comprising polymer of ferulic acid.

The known formulations have often an environmentally polluting production processes, do not reduce the toxicity, are not plant based, require frequent reapplication, are not as effective or are difficult to produce.

Biological weed control (bioherbicides) is an innovative strategy to suppress the germination and growth of weed populations to an economic threshold level by utilizing natural enemies, natural substances, or biotic agents. However, the inconsistency of bioherbicide efficacy is a primary factor restricting their widespread use.

The present invention aims to resolve at least some of the problems and disadvantages mentioned above. The aim of the invention is to provide a formulation which eliminates at least some of those disadvantages.

SUMMARY OF THE INVENTION

The present invention and embodiments thereof serve to provide a solution to one or more of above-mentioned disadvantages. To this end, the present invention relates to a herbicide enhancer agent for enhancing the efficiency of herbicides, comprising a polymer of a hydroxycinnamic acid with an average molecular mass higher than 400 g/mol.

In a second aspect, the present invention relates to a herbicidal formulation, comprising: a herbicide (chemical or bio) and a polymer of a hydroxycinnamic acid with an average molecular mass higher than 400 g/mol, and the weight ratio of the herbicide to the polymer is between 1:10 and 1000:1.

The composition as described herein is particularly advantageous because polymers of a hydroxycinnamic acid are bio-based, safe to use, have high bioavailability, and furthermore aid in efficiently combating weeds without negatively impacting the plant growth and/or harvest yield.

Preferred embodiments are shown in any of the claims 3 to 12.

In a third aspect, the present invention relates to a method for the control of broad-leaved weeds and grasses in a variety of crops, and industrial vegetation or crop management (defoliant and desiccant aiding harvest) according to claim 13. These polymers of a hydroxycinnamic acid cause no toxicity if applied alone but enhance the activity of the herbicide. Therefore, lower quantities of herbicides should be applied while maintaining the same efficacy.

A preferred embodiment of the method is shown in claim 14.

In a fourth aspect the present invention relates to a use according to claim 15. The composition can be used in-can (co-formulated products) or in tank mix, whereby the polymers of a hydroxycinnamic acid are formulated as adjuvant and added to the herbicide in the tank mix or are applied independently in a premix concentrate. The use as of the formulation described herein, provides easy to apply product.

DETAILED DESCRIPTION OF THE INVENTION

The EPA (United States Environmental Protection Agency) defines herbicides as chemicals used to manipulate or control undesirable vegetation. Herbicide are mostly applied before or during planting to maximize crop productivity by minimizing other vegetation. They also may be applied to crops in the fall, to improve harvesting (harvest aid-desiccant). Herbicides are also used in forest management to prepare logged areas for replanting; in suburban and urban areas, herbicides are applied to lawns, parks, golf courses and other areas, and applied to water bodies to control aquatic weeds.

The potential effects of herbicides are strongly influenced by their toxic mode of action and their method of application. The molecular site of action is challenging to predict because structural associations have not been identified but modes of action are well-established. Herbicides can act by inhibiting cell division, photosynthesis or amino acid production or by mimicking natural plant growth hormones, causing deformities. Application methods include spraying onto foliage, applying to soils and applying directly to aquatic systems.

But herbicides are also potentially toxic to humans and the environment. They may induce adverse health effects including cancer, effects on reproduction, immune or nervous systems. Consequently, public concern about the use of herbicides has emerged as a major issue in recent year. Herbicide use reduction is of interest to a diverse group of stakeholders. This interest is driven by farmers, environmentalists, and consumers because of the economic, environmental and health-related impacts of herbicide use.

Strategies for herbicide use reduction range widely, from organic agriculture where no herbicides are used to conventional agriculture systems in which attempts are made to capitalize on opportunities for herbicide use reduction that arise by chance. Several authors have argued that the adoption of sustainable agricultural practices such as herbicide use reduction is most likely if strategies are compatible with the existing production system. In addition, reduction of herbicide use may seem more feasible to many farmers than organic production in terms of profitability and productivity.

A valid strategy for reducing the use of herbicides is their use in combination with synergistic agents, which would optimize the functionality of these chemical products allowing high efficacy at lower application rates.

The present invention concerns a herbicide enhancer agent for enhancing the efficiency of herbicides, comprising a polymer of a hydroxycinnamic acid with an average molecular mass higher than 400 g/mol.

The present invention concerns a biobased herbicide synergistic agent comprising a polymer, and a method for using the same to increase the activity of the herbicide or reduce the effective dose of the herbicide active ingredients and consequently, reduce the harmful effect on organisms, humans and the environment of herbicides.

The inventors have surprisingly found that polymers of a hydroxycinnamic acid can be successfully used to enhance the herbicide activity and can be considered a synergistic agent. These polymers are biobased polymers that lack herbicidal properties on their own but increase the efficacy of herbicide or other chemicals. The addition of a polymer of a hydroxycinnamic acid causes an increase the activity of the herbicide and consequently, reduce the harmful effect on crops, humans and the environment of herbicides. The present invention further relates to a composition for reducing the dose of a herbicide towards a weed. Said composition comprises polymers of a hydroxycinnamic acid and is applied to said weed or to soil in contact with said weed.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any $\geq 3$, $\geq 4$, $\geq 5$, $\geq 6$ or $\geq 7$ etc. of said members, and up to all said members.

An agent which enhances the efficiency of herbicides refers herein to an agent, which in a formulation with a herbicide, increases the herbicidal effect synergistically (as defined by Colby in Calculating Synergistic and Antagonistic Responses of Herbicide Combinations. Weeds, Vol. 15, No. 1 (January, 1967), pp. 20-22)). Furthermore, can the amount of herbicide be reduced, for the same herbicidal effect, when formulated with said agent.

Hydroxycinnamic acids are a class of aromatic acids or phenylpropanoids having a C6-C3 skeleton. These compounds are hydroxy derivatives of cinnamic acid (also known as (2E)-3-Phenylprop-2-enoic acid). Examples are: caffeic acid (also known as 3-(3,4-dihydroxyphenyl)-2-propenoic acid), ortho-coumaric acid (also known as (2E)-3-(2-hydroxyphenyl) prop-2-enoic acid), ferulic acid (also known as (2E)-3-(4-hydroxy-3methoxyphenyl) prop-2-enoic acid), sinapic acid (also known as (2E)-3-(4-Hydroxy-3,5-dimethoxyphenyl) prop-2-enoic acid). A "polymer" comprises at least two monomers. After polymerization, a wide variety of chemical structures can be obtained because hydroxycinnamic acids contain several active groups. Therefore, the degree of polymerization can be determined based on the molecular mass. No residual monomer is present in the polymer.

In a first aspect, the invention relates to a herbicidal formulation comprising: a herbicide and a polymer of a hydroxycinnamic acid. Some documents related to weed control, disclose the use of ferulic acid or a dimer. However, the inventors have unexpectedly observed that polymers of a hydroxycinnamic acid can improve the effect of herbicides without having plant toxic properties. The applied herbicide dose can be reduced with the same efficacy if mixed with the polymers, whereby the weight ratio of the herbicide to the polymer is between 1:10 and 1000:1, preferably 1:10 and 500:1, more preferably between 1:8 and 400:1, even more preferably between 1:5 and 250:1 and most preferably between 1:4 and 200:1.

In an embodiment of the invention, the average molecular mass of the polymer of a hydroxycinnamic acid in the formulation is higher than 400 g/mol and more preferred higher than 700 g/mol. In a more preferred embodiment, said polymer of a hydroxycinnamic acid has an average molecular mass between 700 and 100 000 g/mol, preferably 700 and 50 000 g/mol, even more preferably 800 and 40 000 g/mol, yet even more preferably 900 and 35 000 g/mol, and most preferably between 1000 and 30 000 g/mol.

In an embodiment the weight ratio between said herbicide and the polymer of a hydroxycinnamic acid is between 1:8 and 300:1, more preferably between 1:5 and 100:1, even more preferably between 1:3 and 50:1, and most preferably between 1:2 and 40:1.

In another embodiment the weight ratio between a herbicide and the polymer of a hydroxycinnamic acid is between 1:3 and 20:1, and more preferably between 1:2 and 10:1. In another embodiment the weight ratio between a herbicide and the polymer is between 1:5 and 40:1, and more preferably between 1:2 and 25:1.

In a preferred embodiment, a weight ratio of components (A: a herbicide) and (B: the polymer of a hydroxycinnamic acid) is in a range up to 1000:1, more preferably up to 900:1, more preferably up to 800:1, more preferably up to 700:1, more preferably up to 600:1, more preferably up to 500:1, even more preferably up to 400:1, even more preferably up to 300:1, even more preferably up to 200:1, even more preferably up to 180:1, even more preferably up to 160:1, even more preferably up to 140:1 and yet even more preferably up to 120:1.

In a preferred embodiment, said weight ratio of components (A) and (B) is in a range up to 100:1, more preferably up to 80:1, even more preferably up to 60:1 and yet even more preferably up to 40:1.

In a preferred embodiment, said weight ratio of components (A) and (B) is in a range from 0.1:1 to 50:1, more preferably from 0.2:1 to 46:1, even more preferably from 0.3:1 to 43:1, yet even more preferably from 0.4:1 to 40:1, and most preferably from 0.6:1 to 30:1.

In a preferred embodiment, said weight ratio of components (A) and (B) is in a range from 1:1 to 32:1, more preferably from 1.2:1 to 30:1, even more preferably from 1.4:1 to 28:1, even more preferably from 1.6:1 to 26:1, even more preferably from 1.8:1 to 24:1 and yet even more preferably from 2:1 to 20:1.

In a further preferred embodiment, the herbicide may inhibit photosynthesis at photosystem I or cause inhibition of protoporphyrinogen oxidase (PPO). In a further embodiment, the herbicide is from the chemical family of the phenylpyrazoles or the triazolinones.

In another further preferred embodiment, the herbicide may inhibit photosynthesis at photosystem I or II, production of acetyl COA carboxylase (ACCase), acetohydroxyacid synthase (AHAS), acetolactate synthase, enolpyruvyl shikimate phosphate synthase, lipid synthesis, protoporphyrinogen oxidase (PPO).

In another preferred embodiment, the herbicide may be an alkanoic acid, for example acetic acid, pelargonic acid etc. The weight ratio between said herbicide and the of a hydroxycinnamic acid is between 1:1 and 1000:1, preferably between 1:1 and 800:1, even more preferably between 1:1 and 200:1, yet even more preferably between 4:1 and 200:1 and most preferably between 8:1 and 100:1. In embodiments whereby the herbicide is pelargonic acid, less polymer of a hydroxycinnamic acid is required per dose of herbicide.

The composition includes a chemical herbicide, preferably at 10-90% of its recommended dose, more preferably between 25-75%, and polymer of a hydroxycinnamic acid at a dose of 1-250 g a.i./ha, more preferably between 5-100 g a.i./ha, and most preferably between 10-25 g a.i./ha.

In an embodiment, formulation comprises a polymer and a herbicide whereby the herbicide causes: inhibition of acetyl COA carboxylase (ACCase), inhibition of acetolactate synthase ALS (acetohydroxyacid synthase AHAS), microtubule assembly inhibition, action like indole acetic acid (synthetic auxins), inhibition of photosynthesis at photosystem II (site A), inhibition of photosynthesis at photosystem II (site II), inhibition of lipid synthesis—not ACCase inhibition, inhibition of EPSP synthase, inhibition of glutamine synthethase, inhibition of carotenoid biosynthesis at the phytoene desaturase, inhibition of protoporphyrinogen oxidase (PPO), inhibition of VLCFAs, inhibition of 4-hydroxyphenyl-pyruvate-dioxygenase (4-HPPD), photosystem I electron diversion, inhibition of serine-threonine protein phosphatase or has an unknown mode of action according to the Herbicide Resistance Action Committee.

In an embodiment, formulation comprises a polymer and a herbicide whereby the herbicide causes: inhibition of acetyl CoA carboxylase (ACCase) or inhibition of lipid synthesis—not related to ACCase inhibition.

In an embodiment, formulation comprises a polymer and a herbicide whereby the herbicide causes: inhibition of acetyl COA carboxylase (ACCase), inhibition of acetolactate synthase ALS (acetohydroxyacid synthase AHAS), microtubule assembly inhibition, action like indole acetic acid (synthetic auxins), inhibition of photosynthesis at photosystem II (site A). In an embodiment, formulation comprises a polymer and a herbicide whereby the herbicide causes: inhibition of lipid synthesis—not ACCase inhibition, inhibition of EPSP synthase, inhibition of glutamine synthethase, inhibition of carotenoid biosynthesis at the phytoene desaturase, inhibition of protoporphyrinogen oxidase (PPO), inhibition of VLCFAs, inhibition of 4-hydroxyphenyl-pyruvate-dioxygenase (4-HPPD), photosystem I electron diversion, inhibition of serine-threonine protein phosphatase or has an unknown mode of action according to the Herbicide Resistance Action Committee.

In an embodiment, formulation comprises a polymer and a herbicide whereby the herbicide is from the chemical family of Aryloxyphenoxy-propionate 'FOPs', Benzamide, Benzofuran, Benzoic acids, Benzothiadiazinone, Bipyridylium, Carboxylic acids, Dicarboxylic acids, Chloroacetamide, Cyclohexanedione 'DIMs', Dinitroaniline, Diphenylether, Fatty acids, Glycine, Imidazolinone, Inorganic compounds, Isoxazole, Nonanoic acids, Organophosphate, Oxyacetamide, Phenlpyrazole, Phenoxy-carboxylic-acid, Phenyl-carbamate, "Phenylpyrazoline 'DEN'", Phenylpyridazine, Phenyl urea, Phosphinic acids, Pyridine carboxylic acid, Pyridinecarboxamide, Sulfonylaminocarbonyltriazolinone, Sulfonylurea, Thiocarbamate, Triazine, Triazinone, Triazolinone, Triazolone, Triazolopyrimidine, Triketone, Uracil.

In an embodiment, formulation comprises a polymer and a herbicide whereby the herbicide which can be used in combination with the polymer according to the invention are preferably commercially available herbicides or salts thereof, for example: 2,4-D, Acetic acid, Amidosulfuron, Aminopyralid, Bentazone, Carfentrazone-ethyl, Capric acid, Caprylic acid, Clethodim, Clodinafop, Cyhalofop-butyl, Cyclanilide, Dicamba, Dichlorprop-P, Diflufenican, Diquat, Dimethenamid-P, Endothall, Ethofumesate, Fatty acids C7 to C20, Fatty acids C7-C18 and C18 unsaturated potassium salts, Fatty acids C8-C10 methyl esters, Fenoxaprop-P, Flazasulfuron, Florasulam, Flufenacet (formerly fluthiamide), Fluroxypyr, Foramsulfuron, Glufosinate, Glyphosate, Imazamox, Iodosulfuron, Isoxaflutole, MCPA, Mesosulfuron, Mesotrione, Metamitron, Metazachlor, Metribuzin, Metsulfuron-methyl, Nicosulfuron, Oleic acid, Oryzalin, Oxyfluorfen, Paraquat, Pelargonic acid, Pendimethalin, Penoxsulam, Pethoxamid, Phenmedipham, Picolinafen, Picloram, Pinoxaden, Propaquizafop, Propoxycarbazone, Propyzamide, Prosulfocarb, Pyraflufen-ethyl, Pyridate, Pyroxsulam, Rimsulfuron (renriduron), Saflufenacil, S-Metolachlor, Sodium chlorate, Tembotrione, Terbuthylazine, Thidiazuron, Thiencarbazone-methyl, Thifensulfuron-methyl, Tribenuron (metometuron), Tribufos, Triclopyr, Triflusulfuron.

However, it is obvious that the invention is not limited to this application or to the application on the field. The method according to the invention can be applied in all sorts of set-ups, such as hydroponics, vertical agriculture etc.

Furthermore, the invention is not limited to the herbicides listed in this application. The "HRAC/WSSA Code" provides a global herbicide classification by the Herbicide Resistance Action Committee. The classification of a herbicide depends on its mode of action. The mode of action for each group is described in Table 1. The mode of action indicates the effects and causes of herbicides from said group.

TABLE 1

| classification of herbicides based on the mode of action. | |
| --- | --- |
| HRAC/ WSSA Code | MODE OF ACTION |
| 1 | Inhibition of acetyl COA carboxylase |
| 2 | Inhibition of acetolactate synthase |
| 3 | Inhibition of microtubule assembly |
| 4 | Auxin mimics |
| 5 | Inhibition of photosynthesis at PS II—serine 264 binders |
| 6 | Inhibition of photosynthesis at PS II—histidine 215 binders |
| 9 | Inhibition of enolpyruvyl shikimate phosphate synthase |
| 10 | Inhibition of glutamine synthetase |
| 12 | Inhibition of phytoene desaturase |
| 13 | Inhibition of deoxy-d-xyulose phosphate synthase |
| 14 | Inhibition of protoporphyrinogen oxidase |
| 15 | Inhibition of very long-chain fatty acid synthesis |
| 18 | Inhibition of dihydropteroate synthase |
| 19 | Auxin transport inhibitor |
| 22 | PS I electron diversion |
| 23 | Inhibition of microtubule organization |
| 24 | Uncouplers |
| 27 | Inhibition of hydroxyphenyl pyruvate dioxygenase |
| 28 | Inhibition of dihydroorotate dehydrogenase |
| 29 | Inhibition of cellulose synthesis |
| 30 | Inhibition of fatty acid thioesterase |
| 31 | Inhibition of serine-threonine protein phosphatase |
| 32 | Inhibition of solanesyl diphosphate synthase |
| 33 | Inhibition of homogentisate solanesyltransferase |
| 34 | Inhibition of lycopene cyclase |
| 0 | Unknown mode of action |

A key advantage of the composition comprising polyferulates, is that use of the composition results in a reduction of herbicide dose, allowing a more efficient use of herbicides in targeted plants. As such, by using the composition as described herein, herbicides can be used at lower dose, reducing the probable negative impact on the seed germination, plant growth and/or harvest yield of the crop, meanwhile effectively combating unwanted weed. In contrast to known herbicide enhancers, the composition is of a biological nature, is of no risk to the environment and poses a lower risk of inducing resistance towards herbicides in weed.

The composition compensates for, or reduces, the herbicide environmental pollution and its impact on human and animal health without substantially reducing the herbicidal action against unwanted vegetation.

In some embodiments, the composition can be in a more concentrated form, which is preferred for transport and storing the composition. In some embodiments, the composition is in a more diluted form, which is preferred for direct application to plants.

According to a further or another embodiment, the composition comprises a hydrophilic and/or a lipophilic surfactant, wherein said hydrophilic and/or lipophilic surfactant have a concentration of between 0.01 and 10.00 wt. % based on the total weight of said composition. The term "surfactant" herein relates to organic compounds that are amphiphilic, indicating that they contain both hydrophobic groups and hydrophilic groups. Therefore, a surfactant contains both a water-insoluble (or oil-soluble) component and a water-soluble component. As a result of their specific structure, surfactants will diffuse in water and adsorb at interfaces between an oil and a water phase.

According to a further or another embodiment, the composition has a pH of between 1 and 12. By preference, the composition has a pH of between 5 and 8.

According to a further or another embodiment, said composition is applied to the targeted plant before, simultaneously with, or after application of a herbicide.

According to some embodiments, applying the formulation to the weeds comprises foliar application through spraying of the composition on leaves of the weeds. Spraying of the composition is a particularly favourable method of application as it allows homogeneous distribution of the composition over the weeds. Furthermore, spraying is a very fast method of distributing the composition, allowing the treatment of a large surface area of plants.

The present invention comprises a method whereby a herbicide is applied at 5-95% recommended dose if applied alone, and applying 1 to 500 g polymers of a hydroxycinnamic acid/ha simultaneously with the herbicide or in a period of 10 days prior or after applying the herbicide. More preferably the herbicide is applied at only 20-75% of its recommended dose if applied alone, and mixed with 10 to 25 g polymers of a hydroxycinnamic acid/ha, preferably 12 to 20 g.

In another embodiment, a herbicide is mixed with 5 to 30 g polymers of a hydroxycinnamic acid/ha or with 20 to 50 g of said polymers/ha. In another embodiment, a herbicide is mixed with 2 to 20 g polymers of a hydroxycinnamic acid/ha or with 20 to 40 g polymers of a hydroxycinnamic acid/ha. In another embodiment, a herbicide is mixed, with 1 to 250 g polymers of a hydroxycinnamic acid/ha or with 10 to 300 g of said polymers/ha. In a preferred embodiment, a herbicide is mixed with 1 to 100 g polymers of a hydroxycinnamic acid/ha, more preferably of 1 to 50 g polymers of a hydroxycinnamic acid/ha, and even more preferably 1 to 25 g polymers of a hydroxycinnamic acid/ha and most preferably 5 to 25 g polymers of a hydroxycinnamic acid/ha.

The herbicidal formulation comprising a herbicide and polymers of a hydroxycinnamic acid, can be formulated together in an appropriate ratio of the present invention, together with conventional formulation aids as known in the art, such as, for example, one or more carriers.

In a preferred embodiment, the herbicide composition according to the first aspect of the present invention further comprises one or more additional components selected from the group comprising other herbicides such as herbicides, insecticides, fungicides or other active herbicide ingredients, safeners, antioxidants, chemical stabilizers, adhesives, fertilizers, perfumes, colorants, liquid carriers, solid carriers, surface-active agents, crystallisation inhibitors, viscosity modifiers, suspending agents, spray droplet modifiers, pigments, foaming agents, light-blocking agents, compatibility agents, antifoam agents, sequestering agents, neutralising agents and buffers, wetting and dispersing agents, preservatives, thickening agents, corrosion inhibitors, freezing point depressants, odorants, spreading agents, penetration aids, micronutrients, emollients, lubricants, sticking agents and humectants, such as, for example, propylene glycol. According to preferred embodiments, the herbicide composition can also comprise various agrochemically active compounds, for example from the group of the acaricides, nematicides, bird repellents, and soil structure improvers.

The herbicidal formulation comprising a herbicide and a polymer of a hydroxycinnamic acid, can be used for controlling weeds in a premix concentrate or in a tank mix. In another embodiment both components of said formulation are not applied together but separately in a period of up to 10 days. More preferably, the period between application of the two components is less than 5 days. Application can be conducted by spraying onto foliage, applying to soils or the air and applying directly to aquatic systems.

Said synergistic effect of a herbicide and said polymer can be observed, for example, in the case of a ready-mix application, of, for example, a ready-to-use formulation, emulsifiable concentrate formulation, microemulsifiable concentrate, suspension concentrate formulation, oil dispersion formulation, soluble liquid formulation, wettable powder formulation, water dispersible granule, water soluble granule formulation, and in the case of a tank mix; however, they can also be observed when the active compounds are applied at different times (splitting) (packed, for example, as combipack or monodoses). It is also possible to apply the herbicides or the herbicide composition in a plurality of portions (sequential application), for example post-emergence applications or early post-emergence applications followed by medium or late post-emergence applications. For some herbicides it can relevant that when applied as a tank mix, it has to be ensured that an obtained spray liquor is applied relatively quickly after preparation.

The herbicidal formulation according to some embodiments of the present invention has very good herbicidal properties and can be used for controlling unwanted vegetation. In an embodiment, the herbicidal formulation according to the first aspect of the present invention can be used as total herbicide for controlling unwanted vegetation, for example in particular on non-crop areas like amenity areas such as paths, squares and also under trees and shrubs, rail tracks etc. The herbicidal formulation according to the first aspect of the present invention is distinguished by an action which has a particularly quick onset and lasts for a long time.

In a second aspect, the present invention relates to a method for controlling weeds or for aiding harvest (desiccant), the method comprises: applying a herbicide at 2-98% of its recommended dose if applied alone, and applying 1 to 500 g polymers of a hydroxycinnamic acid/ha simultaneously with the herbicide or in a period of 10 days prior to or after applying the herbicide. Preferably the In a further embodiment, the herbicide is applied at 20-75% of its recommended dose if applied alone, and mixed with 10 to 25 g polymers of a hydroxycinnamic acid/ha.

In an embodiment, the method comprises: applying the herbicide at 20-75% of its recommended dose if applied alone, and applying 10 to 25 g polymers of a hydroxycinnamic acid/ha simultaneously with the herbicide or in a period of 10 days prior to or after applying the herbicide. Preferably the difference between both applications is less than 7 days, more preferably less than 4 days and most preferably less than 72 hours.

In an embodiment, the herbicide formulation is applied onto one or more types of unwanted vegetation shortly before or around emergence of one or more crop types in proximity of said unwanted vegetation, wherein the herbicide composition can be reapplied at a specified time interval of 1 days to 20 days, more preferably 4 to 10 days and most preferably 5 to 7 days until harvest of said one or more crop types.

In another embodiment, ferulic acid is chosen as hydroxycinnamic acid and polyferulates are used in the formulation together with a herbicide. In an embodiment, the polyferulates are used in the formulation together with a herbicide. A synergy between both components of the formulation was observed. Lower quantities of herbicides were required to have the same effect, compared to the use of the herbicide alone.

In an embodiment, the polymers of a hydroxycinnamic acid, preferably polyferulates, are used for crop desiccation. Crop desiccation refers to the application of an agent to a crop just before harvest to kill the leaves and/or plants so that the crop dries out from environmental conditions more quickly and evenly. In agriculture, the agents used are herbicides and/or defoliants used to artificially accelerate the drying of plant tissues. Desiccation of crops through the use of herbicides is practiced worldwide on a variety of food and non-food crops. The main aim is to improve the efficiency and reduce the costs of mechanical harvesting. When applying polymers of a hydroxycinnamic acid together with said herbicides and/or defoliants, an improved efficiency can be expected.

In an embodiment, the polymers of a hydroxycinnamic acid, preferably polyferulates, are used in a method for controlling weeds or for aiding harvest (desiccant), the method comprises: applying a herbicide at 2-98% of its recommended dose if applied alone, and applying 1 to 500 g polymers of a hydroxycinnamic acid/ha simultaneously with the herbicide or in a period of 10 days prior to or after applying the herbicide. In a further embodiment, the herbicide is applied at 20-75% of its recommended dose if applied alone, and mixed with 10 to 25 g polymers of a hydroxycinnamic acid/ha.

In a third aspect, the present invention relates to the use of the formulation according to the first aspect for controlling weeds, or aiding harvest (desiccant) via a premix concentrate, applied before, simultaneously (coformulation) or after the herbicide or in a tank mix with herbicide(s).

In an embodiment, the formulation as described herein can be used to increase the herbicide uptake of the plant with 40-75% compared to the uptake of the plant when only the herbicide was used, without the polymer.

The present invention relates to the use of the formulation for controlling weeds, or aiding harvest (desiccant) via a premix concentrate, wherein the polymer of a hydroxycinnamic acid are applied before, simultaneously (coformulation) or after the herbicide or in a tank mix with herbicide(s). The present invention relates to the use of the herbicide enhancer agent for controlling weeds, or aiding harvest (desiccant) via a premix concentrate, wherein the polymer of a hydroxycinnamic acid are applied before, simultaneously (coformulation) or after the herbicide or in a tank mix with herbicide(s).

The present invention relates to the use of a herbicide enhancer agent for enhancing the efficiency of herbicides, wherein the herbicide enhancer agent comprises a polymer of a hydroxycinnamic acid with an average molecular mass higher than 400 g/mol.

The skilled person will realize that the formulation according to the invention can be applied via a method described in herein and that the method described herein is conducted using the formulation according to the invention.

Each embodiment or characteristic described in this document, above and below, can thus be applied to each of the different aspects of the invention.

The invention is further described by the following non-limiting examples which further illustrate the invention, and are not intended to, nor should they be interpreted to, limit the scope of the invention.

The present invention will be now described in more details, referring to examples that are not limitative.

FIGURE TITLES

FIG. 1. Overlaid SEC chromatograms of the ferulic acid (starting of the reaction) and polyferulates (end product).

Figure 2:
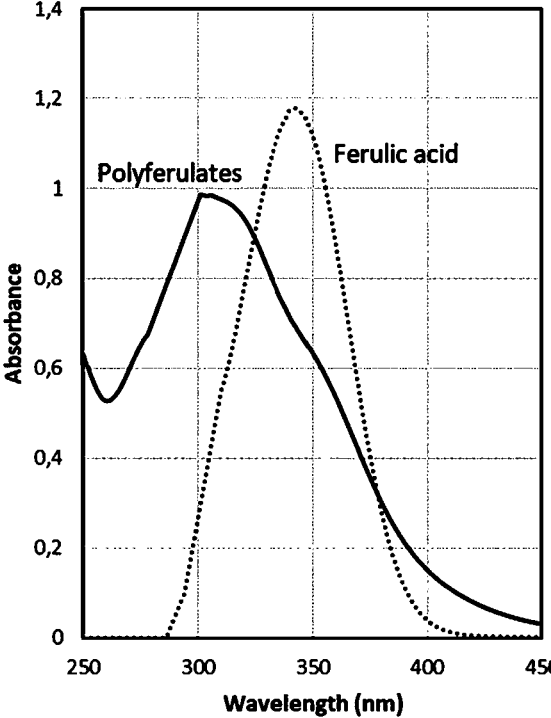

FIG. 2. UV spectra of ferulic acid and polyferulates.

Figure 3:
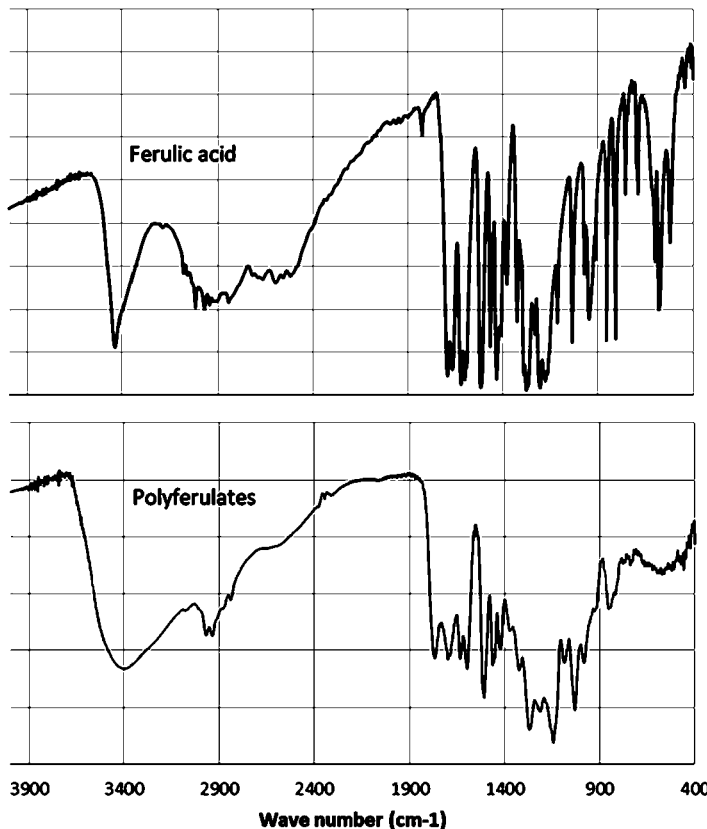

FIG. 3. FT-IR spectra of ferulic acid and polyferulates.

FIGURE DESCRIPTION

FIG. 1 shows overlaid SEC chromatograms, obtained using a Sephacryl S-200 column. High molecular weight polyferulates are eluted from the column first. Monomeric ferulic acid was eluted afterwards. The absence of overlapping between the two chromatograms confirms the absence of monomeric ferulic acid residues in the final product.

The structural differences between the initial product (ferulic acid) and the final product (polyferulates) were confirmed by UV analysis (FIG. 2). In the UV absorption spectrum of polyferulates, a shift of about 44 nm of the band at 344 nm with respect to ferulic acid was observed. This shift was undoubtedly due to the formation of the polymerization bond between ferulate units.

FIG. 3 shows the FTIR spectra of polyferulates and ferulic acid which are significantly different. The broadening of the signal at 3400 cm-1 in the polyferulate spectrum indicates the presence of a higher numbers of labile proton due to carboxylic acid groups and phenolic groups in polyferulates, the smaller signals at 3000 cm-1, characteristic of the stretching of the C—H bonds of the aromatic groups, is slightly more intense and better resolved because of the large amount of aromatic rings in the polyferulates. Additionally, the signal at 1700 cm-1 characteristic of the carboxylic functions is much less intense for the polyferulates. This could be due to the three-dimensional arrangement of the polyferulates which may limit the possibilities of vibrations of the C=O double bonds.

DESCRIPTION OF EXAMPLES

Example 1. Preparation of Polyferulates

Polyferulates are prepared by an eco-friendly procedure. The oxidation and subsequent polymerization of biobased ferulic acid is facilitated by an enzyme. The reaction mixture comprises 3 L of 50 mM potassium phosphate buffer, pH 6.0, 2 L of methanol, 20 ml of 1% Horseradish peroxidase (HRP) solution (with activity of 150 units/mg), 1 L of methanol solution of ferulic acid (10 g/L) and 0.6% hydrogen peroxide (400 ml) added dropwise at 0.5 ml/min. The reaction is monitored simultaneously by FPLC-SEC using a column of Sephacryl S-200 and LC-MS. The reaction is carried out at 30° C. until neither monomeric ferulic acid nor small oligomers are detected in the reaction mixture (around 48 h). The polyferulates are isolated by precipitation at low pH and purified by washing with cold water and freeze-dried.

Example 2: Compositions Comprising Polyferulates and Chemical Herbicide Active Ingredient (AI)

The tables below (2-6) contain example compositions comprising both a polyferulate and a herbicide according to the present invention. The compositions exemplified hereunder are particularly suited for combating weed growth in a targeted crop or desiccant as harvest aid. The polyferulates herein serves as a synergistic, i.e. aids enhancing herbicides activities in the targeted plant.

TABLE 2

| Polyferulate and herbicide composition I | | |
|---|---|---|
| Component | Function | Rate |
| Polyferulate | Synergistic agent | 12.00 g a.i. ha$^{-1}$ |
| Pyraflufen-ethyl | Herbicide | 15.90 g a.i. ha$^{-1}$ |
| Esterified vegetable oil | Adjuvant | 1.5 Kg. ha$^{-1}$ |
| Water | Solvent | 300 Kg. ha$^{-1}$ |

TABLE 3

| Polyferulate and herbicide composition II | | |
|---|---|---|
| Component | Function | Rate |
| Polyferulate | Synergistic agent | 12.00 g a.i. ha$^{-1}$ |
| Carfentrazone-ethyl | Herbicide | 30.00 g a.i. ha$^{-1}$ |
| Water | Solvent | 300 Kg. ha$^{-1}$ |

TABLE 4

| Polyferulate and herbicide composition III | | |
|---|---|---|
| Component | Function | Rate |
| Polyferulate | Synergistic agent | 10.00 g a.i. ha$^{-1}$ |
| Profoxydim | Herbicide | 150.00 g a.i. ha$^{-1}$ |
| Liquid hydrocarbon | Solvent | 557.00 g. ha$^{-1}$ |
| Esterified vegetable oil | Adjuvant | 1.5 Kg. ha$^{-1}$ |
| Water | Solvent | 300 Kg. ha$^{-1}$ |

TABLE 5

| Polyferulate and herbicide composition IV | | |
|---|---|---|
| Component | Function | Rate |
| Polyferulate | Synergistic agent | 12.00 g a.i. ha$^{-1}$ |
| Pelargonic acid | Herbicide | 178.00 g a.i. ha$^{-1}$ |
| Water | Solvent | 300 Kg. ha$^{-1}$ |

TABLE 6

| Polyferulate and herbicide composition V | | |
|---|---|---|
| Component | Function | Rate |
| Polyferulate | Synergistic agent | 18.00 g a.i. ha$^{-1}$ |
| Diquat dibromide monohydrate | Herbicide | 210.00 g a.i. ha$^{-1}$ |
| Non-Ionic Organic Surfactant | Adjuvant | 0.5 Kg. ha$^{-1}$ |
| Water | Solvent | 300 Kg. ha$^{-1}$ |

Example 3. Synergy of Polyferulates and Herbicides on Potato Plants Desiccation

Preparation for harvest is an important step in the production of potatoes since there is lush growth of the aerial parts due to intensive fertilization. Tubers in such crops reach maturity very late and are more susceptible to mechanical damage (bruises). Desiccation before the harvest of potatoes improves the appearance of tubers, enhances periderm development and improves storability.

The experiment in potato plant was carried out in random blocks in four replications. The area of field plots was around 40.0 m² (width-4.0 m, length-10.0 m). The desiccant was applied by spraying. The desiccation efficiency was visually evaluated 15 days after treatment, and the condition of potato foliage and stalks was compared for each desiccant treated and untreated plots. Efficacy of desiccation was shown as a percent scale, where 100% was total damage of leaves and stems and 0% was the lack of a desiccant effect.

TABLE 7

Desiccant action on potato leaf of the composition according to the invention comprising polyferulate and different herbicide at day 15 after application (15DAA).

| Chemical family (Herbicid Mode of Action Classification) | Component | Application rate | Desiccation (%) | Expected values according to Colby |
|---|---|---|---|---|
| Carboxylic Acids (0) | Pelargonic acid | 10880 | 95 | |
| | | 5440 | 68 | |
| | | 2720 | 51 | |
| | Pelargonic acid + PolyFerulate | 5440 + 12 | 79 | 68.6 (+10.4) |
| | | 2720 + 12 | 78 | 52.0 (+26) |
| Phenylpyrazole (14) | Pyraflufen-ethyl | 21.2 | 90 | |
| | | 15.9 | 85 | |
| | | 10.6 | 78 | |
| | | 5.3 | 60 | |
| | Pyraflufen-ethyl + PolyFerulate | 15.9 + 12 | 92 | 85.3 (+6.7) |
| | | 10.6 + 12 | 90 | 78.4 (+11.6) |
| | | 5.3 + 12 | 73 | 60.8 (+12.2) |
| | Carfentrazone-ethyl | 60 | 96 | |
| | | 30 | 73 | |
| | Carfentrazone-ethyl + Ferulic acid | 30 + 12 | 73 | 73.8 (−0.8) |
| N-Phenyl-triazolinones (14) | Carfentrazone-ethyl + Diferulic acid | 30 + 12 | 62 | 73.5 (−11.5) |
| | Carfentrazone-ethyl + PolyFerulate | 30 + 12 | 85 | 73.5 (+11.5) |
| | Ferulic acid | 12 | 3 | |
| | Diferulic acid | 12 | 2 | |
| | PolyFerulate | 12 | 2 | |

The expected response of the herbicide combination according to Colby (Calculating Synergistic and Antagonistic Responses of Herbicide Combinations. Weeds, Vol. 15, No. 1 (January, 1967), pp. 20-22). When the observed response is greater than expected, the combination is synergistic; when less than expected, it is antagonistic. If the observed and expected responses are equal, the combination is additive. The difference between observed and expected values are shown by a plus sign to indicate synergism, and a minus, antagonism.

Surprisingly, the polyferulate shows a synergistic effect with all the three herbicides tested. Nevertheless, the low molecular weight oligomers (diferulate) and the monomer (ferulic acid) show the opposite effect (antagonist).

Example 4. Herbicide Synergistic Effect of Polyferulates Depends on his Molecular Weight Polyferulates of different molecular weights were prepared varying the reaction time of the enzymatic procedure described in the example 1. The molecular weight of each polyferulates batch was determined by SEC using a sephacryl S-200 column. The herbicide synergistic effects were evaluated in potato plants using carfentrazone-ethyl (desiccant) as described in example 3.

TABLE 8

Desiccant action on potato leaf of different compositions comprising carfentrazone-ethyl and polyferulates of different molecular weight at day 15 after application (15DAA).

| Component | Application rate (g a.i. ha⁻¹) | Desiccation (%) | Expected values according to Colby |
|---|---|---|---|
| Carfentrazone-ethyl | 25 | 56 | |
| Polyferulate (MW = 930, n = 4.8) | 12 | 2 | |
| Polyferulate (MW = 1251, n = 6.4) | 12 | 2 | |
| Polyferulate (MW = 2408, n = 12.4) | 12 | 5 | |
| Carfentrazone-ethyl + Polyferulate (MW = 930, n = 4,8) | 25 + 12 | 61 | 56.9 (+4.1) |
| Carfentrazone-ethyl + Polyferulate (MW = 1251, n = 6,4) | 25 + 12 | 72 | 56.9 (+15.1) |
| Carfentrazone-ethyl + Polyferulate (MW = 2408, n = 12,4) | 25 + 12 | 94 | 58.2 (+35.8) |

MW: Average molecular weight as determined by SEC
n: Average number of monomeric ferulic units in the polyferulate backbone The expected response of the herbicide combination according to Colby (Calculating Synergistic and Antagonistic Responses of Herbicide Combinations. Weeds, Vol. 15, No. 1 (January, 1967), pp. 20-22). When the observed response is greater than expected, the combination is synergistic; when less than expected, it is antagonistic. If the observed and expected responses are equal, the combination is additive. The difference between observed and expected values are shown by a plus sign to indicate synergism, and a minus, antagonism.

Surprisingly, the synergistic effect on the herbicide activity of polyferulates rise with increasing molecular weight. Polyferulates having average MW of 2408 are showing a higher (more than a double) difference between observed and expected response (according to Colby) than polyferulates having a MW of 1251, and the former are showing more than three times difference between observed and expected response than polyferulates having MW of 930.

Example 5. Polyferulates Enhance Herbicidal Activity of Different Chemicals Active Ingredient (AI)

The experiment was carried out in *Lemna minor* growing in vitro conditions. *Lemna minor* (duckweed) was bought in the local market. A stock culture was maintained on modified Hoagland medium in a controlled environment. The pH of the medium was adjusted to 6.0, and the plants were grown under static conditions in a plant growth chamber at 25±2° C., light/dark regime of 16 h/8 h.

For the experiments, fronds free from any visible chlorosis were taken from the stock cultures and exposed to the appropriate treatment. For each treatment, we used six repetitions with three fronds per repetition as the initial frond number. Individual fronds were transferred to a 12 well multiplate containing Hoagland medium (control), Hoagland medium containing polyferulates, herbicides or the combination as shown in Table 9. All chemicals were evaluated at the same concentration (10 mg/L). The multiplate was covered with a transparent cover to prevent evaporation. The herbicide activity was evaluated as fresh weight reduction compared to untreated plants after one week of incubation in the described conditions.

TABLE 9

Efficacy of several herbicides on Lemma minor at the end of 7-day exposure.

| Chemical family (Herbicide Mode of Action Classification) | Component | Herbicide activity | Expected values according to Colby* |
|---|---|---|---|
| Carbamates (5) | Polyferulates | 3 | |
| | Phenmedipham | 3 | |
| | Phenmedipham + Polyferulates | 88 | 5.9 (+82.4) |
| Benzofuran (16) | Ethofumesate | 0 | |
| | Ethofumesate + Polyferulates | 73 | 3.0 (+69.7) |
| Sulfonylurea (2) | Triflusulfuron-methyl | 34 | |
| | Triflusulfuron-methyl + Polyferulates | 61 | 36.0 (+25.3) |
| Cyclohexanedione (1) | Profoxydim | 45 | |
| | Profoxydim + Polyferulates | 56 | 46.7 (+9.2) |

*The expected response of the herbicide combination according to Colby (Calculating Synergistic and Antagonistic Responses of Herbicide Combinations. Weeds, Vol. 15, No. 1 (January, 1967), pp. 20-22). When the observed response is greater than expected, the combination is synergistic; when less than expected, it is antagonistic. If the observed and expected responses are equal, the combination is additive. The difference between observed and expected values are shown by a plus sign to indicate synergism, and a minus, antagonism.

As the experiment was carried out "in vitro", a low concentration of all herbicidal molecules was used (10 mg/L). Under these conditions, not all the molecules separately show a herbicidal effect. However, when these herbicidal molecules were combined with polyferulates, in all cases, a synergistic effect were observed.

Example 6. Polyferulates Enhance Herbicide Activity in Weeds Control

*Echinochloa colona* is a cosmopolitan weed common in crops (mainly rice, maize and vegetables), gardens, roadsides, disturbed sites, waste areas and pastures. It also grows along waterways, on the margins of lakes and ponds, in swamps and wetlands, and in other damp habitats. It has the potential to invade natural areas and completely outcompete native vegetation. This weed pose a significant threat to rice productivity globally and are usually reported as noxious weeds in several economically important crops around the world. *E. colona* has vigorous growth traits and high seed production since each *E. colona* plant can produce up to 42,000 seeds. The experiment in *Echinochloa colona* plants was carried out in independent pots and in four replications. The area of field plots was around 40.0 m² (width—4.0 m, length—10.0 m). The products were applied by spraying. The herbicide activity was visually evaluated 20 days after treatment.

TABLE 10

Efficacy of several herbicides on E. colona at 20 days after treatment (20 DAT).

| Chemical family (Herbicide Mode of Action Classification) | Component | Application rate (g a.i. ha⁻¹) | Herbicide activity | Expected values according to Colby* |
|---|---|---|---|---|
| Cyclo-hexanediones (1) | PolyFerulate | 10 | 4 | |
| | Profoxydim | 110 | 34 | |
| | Profoxydim + PolyFerulate | 110 + 10 | 57 | 36.6 (+20.4) |
| Triazolo-pyrimidine (2) | Penoxsulam | 30 | 16 | |
| | Penoxsulam + PolyFerulate | 30 + 10 | 67 | 19.4 (+47.6) |
| Glycines (9) | Glyphosate | 550 | 59 | |
| | Glyphosate + PolyFerulate | 550 + 10 | 88 | 60.6 (+27.4) |

*The expected response of the herbicide combination according to Colby (Calculating Synergistic and Antagonistic Responses of Herbicide Combinations. Weeds, Vol. 15, No. 1 (January, 1967), pp. 20-22). When the observed response is greater than expected, the combination is synergistic; when less than expected, it is antagonistic. If the observed and expected responses are equal, the combination is additive. The difference between observed and expected values are shown by a plus sign to indicate synergism, and a minus, antagonism.

Surprisingly, the polyferulate shows a synergistic effect with all the three herbicides tested. Higher concentrations of polyferulate up to 25 g/ha resulted in similar effects.

Example 7. Dose Effect on the Combination of Polyferulates and a Desiccant Herbicide on Potato Plants The trial was carried out in a greenhouse in potato plants. The desiccant (pyraflufen-ethyl, a Protoporphyrinogen Oxidase (PPO) Inhibitor) was applied by spraying at different percentage of the recommended doses alone or combined with polyferulates. The effect of the herbicide was first evaluated by measurements of the photosynthetic capacity of treated leaves using the QY (quantum yield) three days after foliar application and the final desiccation efficiency was evaluated 14 days after treatment. The herbicide activity (desiccation efficiency) was evaluated as fresh weight reduction respect to untreated plants (control) an expressed in percentage.

TABLE 11

Effect on plant photosynthesis activity and desiccant action (fresh weight reduction) on potato leaf of different compositions comprising pyraflufen-ethyl alone or combined with polyferulate at day 14 after application (14DAA).

| Treatment | Fresh weight of the plants (% of control) | Quantum yield of PSII |
|---|---|---|
| Untreated | 100 | 0.79 |
| Pyraflufen-ethyl (25% of recommended dose) | 39 | 0.6 |
| Pyraflufen-ethyl (50% of recommended dose) | 22 | 0.461 |
| Pyraflufen-ethyl (75% of recommended dose) | 14 | 0.385 |

TABLE 11-continued

Effect on plant photosynthesis activity and desiccant action
(fresh weight reduction) on potato leaf of different compositions
comprising pyraflufen-ethyl alone or combined with polyferulate
at day 14 after application (14DAA).

| Treatment | Fresh weight of the plants (% of control) | Quantum yield of PSII |
|---|---|---|
| Pyraflufen-ethyl (100% of recommended dose) | 10 | 0.335 |
| Polyferulates | 98 | 0.76 |
| Pyraflufen-ethyl (25% of recommended dose) + polyferulates | 27 | 0.36 |
| Pyraflufen-ethyl (50% of recommended dose) + polyferulates | 9.2 | 0.25 |
| Pyraflufen-ethyl (75% of recommended dose) + polyferulates | 8.3 | 0.25 |
| Pyraflufen-ethyl (100% of recommended dose) + polyferulates | 8.5 | 0.268 |

This result shows that polyferulates stimulate the mechanism of action (reduction of photosynthesis) of postemergence PPO type herbicide and thus, allows similar efficacy in terms of potatoes leaves desiccation if using lower doses of the herbicide active ingredients.

Example 8. Herbicide Synergistic Effect of Polyferulates in Function of the Application Timing The herbicide synergistic effects were evaluated in potato plants using pyraflufen-ethyl (desiccant). Polyferulates were applied the day before the desiccant spraying (D−1), in tank mix combination with the desiccant (D−0) or the day after the desiccant spraying (D+1). The experiment in potato plant was carried out in random blocks in four replications. The desiccant was applied by spraying. The desiccation efficiency was visually evaluated 15 days after treatment, and the condition of potato foliage and stalks was compared for each desiccant treated and untreated plots.

Efficacy of desiccation was shown as a percent scale, where 100% was total damage of leaves and stems and 0% was the lack of a desiccant effect.

TABLE 12

Desiccant action on potato leaf of different compositions comprising
pyraflufen-ethyl and polyferulates applied the day before the desiccant
spraying (D − 1), in tank mix combination with the desiccant (D − 0) and
the day after the desiccant spraying (D + 1).

| Component | Application rate (g a.i. ha$^{-1}$) | Desiccation (%) | Expected values according to Colby |
|---|---|---|---|
| Pyraflufen-ethyl | 10.6 | 79 | |
| Polyferulate | 12 | 2 | |
| Pyraflufen-ethyl + Polyferulate (D − 1) | 10.6 + 12 | 96 | 79.4 (+16.6) |
| Pyraflufen-ethyl + Polyferulate (D − 0) | 10.6 + 12 | 90 | 79.4 (+10.6) |
| Pyraflufen-ethyl + Polyferulate (D + 1) | 10.6 + 12 | 89 | 79.4 (+9.6) |

The expected response of the herbicide combination according to Colby (Calculating Synergistic and Antagonistic Responses of Herbicide Combinations. Weeds, Vol. 15, No. 1 (January, 1967), pp. 20-22). When the observed response is greater than expected, the combination is synergistic; when less than expected, it is antagonistic. If the observed and expected responses are equal, the combination is additive. The difference between observed and expected values are shown by a plus sign to indicate synergism, and a minus, antagonism.

Surprisingly, the synergistic effect on the herbicide activity of polyferulates rises when applied to the targeted plant before, simultaneously with, or after application of a herbicide.

The present invention is in no way limited to the embodiments described in the examples. On the contrary, methods according to the present invention may be realized in many different ways without departing from the scope of the invention.

Example 9. Polyferulates Enhance Herbicide Uptake into Plant Foliage

Tomato (*Solanum lycopersicum*) plants were sprayed with a diluted solution of pyraflufen-ethyl herbicide or a diluted solution of pyraflufen-ethyl herbicide combined with polyferulates. Samples of treated leaves were taken at 2 h and 24 h after treatment. An extraction procedure following successive steps was used to describe the distribution of pyraflufen-ethyl residues on and in plant leaves. Four fractions of pesticide residues were recovered: (i) the fraction of pesticide susceptible to wash-off by rain that was assumed to correspond to the water-washable fraction, (ii) the fraction of pesticide having adsorbed on the leaf surface that was assumed to correspond to the ethanol-extracted fraction, (iii) the fraction of pesticide having penetrated into the cuticle that was assumed to correspond to the hexane-extracted fraction, and (iv) the fraction of pesticide having penetrated into the foliar tissues that was assumed to correspond to the bound residues fraction. Table shows the overall balance of the distribution of the herbicide between the different extracted fractions from leaves.

TABLE 13

Distribution kinetics of herbicide active ingredient (pyraflufen-ethyl
µg/g of fresh weight leaves) between the different extracted
fractions from leaves, including the water-, ethanol-, and
hexane-extracted fractions and the bound residues fraction.

| Fractions | Herbicide (pyraflufen-ethyl) | | Herbicide (pyraflufen-ethyl) combined with polyferulates | |
|---|---|---|---|---|
| | 2 h | 24 h | 2 h | 24 h |
| Water-washable fraction | 3.34 | 3.1 | 7.6 | 4.66 |
| Ethanol-extracted fraction | 1.88 | 1.59 | 2.32 | 2.46 |
| Hexane-extracted fraction | 0.51 | 0.94 | 0.55 | 1.62 |
| Bound residues fraction | 0.16 | 0.12 | 0.17 | 0.34 |

These results show that applying the herbicide in combination with polyferulates stimulated the penetration of the active molecule in the different fractions of the leaves. The presence of polyferulates not only increased the amount of the active molecule detected in the different layers of the vegetable leaf, but also accelerated the dynamics of absorption over time.

Example 10. Application of Polyferulates Alone in Plants Disturbs Plant Physiology without Killing them Three-week-old tomato (*Solanum lycopersicum*) plants were sprayed with solutions of polyferulates at different concentrations. Twenty-four hours after treatment, the plants' photosynthetic activity (QY) and peroxidase activity were quantified. QY measures the maximum photochemical yield of PSII and thus the efficiency of photosynthesis at the beginning of the photosynthetic chain. Peroxidases are the ubiquitous enzyme and reported to be present in all living genera. These enzymes are oxidases that uses hydrogen peroxide as an electron acceptor to catalyze substrates. Numerous biotic and abiotic stressors have been associated with the induction of peroxidases in plants. The results appear in the table.

TABLE 14

Effect of foliar spraying of polyferulates on the efficiency of photosynthesis and peroxidase activity on plant leaves

| Treatment | QY (efficiency of photosynthesis) | Peroxidase activity (DO 470 nm · mg of protein$^{-1}$ · min$^{-1}$) |
|---|---|---|
| Control (untreated) | 0.82 | 0.9 |
| Polyferulates (40 mg/L) | 0.77 | 1.6 |
| Polyferulates (80 mg/L) | 0.70 | 6.5 |
| Polyferulates (160 mg/L) | 0.68 | 10.2 |

These results show that polyferulates slightly reduce the photosynthetic activity of plants and induce plant stress reactions such as peroxidase activity.

Example 11: Effect of Foliar Application of Polyferulates in *Arabidopsis* Plants

*Arabidopsis thaliana* seeds were sown in soil and the pots were kept for four days for vernalization (4° C. in darkness) for uniform seed germination. Afterward, the pots were kept in a growth chamber in a 12 h light (21° C., 60% relative humidity)/12 h dark (16° C., 70% relative humidity) cycle. At least 50 developed 30 day-old plants were used for the experiments. Half of the plants were sprayed with a solution comprising polyferulates, the other half were sprayed with water (control-C). All plant leaves from three biological replicates were snap-frozen in liquid nitrogen. Sample collection was conducted 24 h after foliar spraying treatment, and transcriptome sequencing was performed.

The table below shows the number of genes which were differentially expressed after treatment with the present composition. Only genes dysregulated with fold times >2 in relation to control were considered.

TABLE 15

Number of genes differentially expressed in *Arabidopsis* after foliar spraying with a composition comprising polyferulates

| | Number of genes | Differentially expressed genes (%) |
|---|---|---|
| Up-regulated | 219 | 57.5 |
| Down-regulated | 162 | 42.5 |
| Total | 381 | |

These above results demonstrated that foliar application of a composition comprising polyferulates on plants has a high impact on plant transcriptome. To gain insights into the molecular mechanisms involved in bioactivity of polyferulates, a Gene Ontology (GO) enrichment analysis of the differentially expressed genes (DEG) was performed. A selection of them are summarized in the table below.

TABLE 16

Number of differentially regulated genes.

| | Number of genes | Percentage of associated genes (%) | ID |
|---|---|---|---|
| response to stimulus | 121 | 12.5 | GO: 0050896 |
| response to stress | 90 | 9.3 | GO: 0006950 |
| response to chemical | 79 | 8.2 | GO: 0042221 |
| response to external stimulus | 51 | 5.3 | GO: 0009605 |
| response to abiotic stimulus | 51 | 5.3 | GO: 0009628 |
| response to oxygen-containing compound | 48 | 5.0 | GO: 1901700 |
| defense response | 46 | 4.8 | GO: 0006952 |
| response to organic substance | 46 | 4.8 | GO: 0010033 |
| response to other organism | 44 | 4.6 | GO: 0051707 |
| response to external biotic stimulus | 44 | 4.6 | GO: 0043207 |
| biological process involved in interspecies interaction between organisms | 44 | 4.6 | GO: 0044419 |
| response to biotic stimulus | 44 | 4.6 | GO: 0009607 |
| cellular response to chemical stimulus | 42 | 4.3 | GO: 0070887 |

These results demonstrated that among the differentially regulated genes, a significant number of them are associated with biological processes linked to the plant responses to stress conditions. It is thereby shown that treatment of *Arabidopsis* with a composition comprising polyferulates has a major influence in plant metabolism.

The invention claimed is:

1. A herbicidal formulation, the formulation comprising: a chemical or bio herbicide and a polymer, characterized in that, the polymer is a polymer of a hydroxycinnamic acid with an average molecular mass higher than 400 g/mol, and the weight ratio of the herbicide to the polymer is between 1:10 and 1000:1.

2. The formulation according to claim 1, characterized in that, average the molecular mass of the polymer higher is than 700 g/mol.

3. The formulation according to claim 1, characterized in that, the polymer has an average molecular mass between 700 and 50 000 g/mol.

4. The formulation according to claim 3, characterized in that, the polymer has an average molecular mass between 1000 and 30 000 g/mol.

5. The formulation according to claim 1, characterized in that the weight ratio of the herbicide to the polymer is between 1:10 and 500:1.

6. The formulation according to claim 1, characterized in that, the herbicide causes: inhibition of acetyl CoA carboxylase (ACCase), inhibition of acetolactate synthase ALS, microtubule assembly inhibition, action like indole acetic acid, inhibition of photosynthesis at photosystem II (site A), inhibition of photosynthesis at photosystem II (site II), inhibition of lipid synthesis that is not ACCase inhibition, inhibition of EPSP synthase, inhibition of glutamine synthethase, inhibition of carotenoid biosynthesis at the phytoene desaturase, inhibition of protoporphyrinogen oxidase (PPO), inhibition of VLCFAS, inhibition of 4-hydroxyphenyl-pyruvate-dioxygenase (4-HPPD), photosystem I electron diversion, inhibition of serine-threonine protein phosphatase or has an unknown mode of action according to the Herbicide Resistance Action Committee.

7. The formulation according to claim 6, characterized in that, the herbicide is selected from a chemical family comprising: Aryloxyphenoxy-propionate 'FOPs', Benzamide, Benzofuran, Benzoic acids, Benzothiadiazinone, Bipyridylium, Carboxylic acids, Dicarboxylic acids, Chloroacetamide, Cyclohexanedione 'DIMs', Dinitroaniline, Diphenylether, Fatty acids, Glycine, Imidazolinone, Inorganic compounds, Isoxazole, Nonanoic acids, Organophosphate, Oxyacetamide, Phenlpyrazole, Phenoxy-carboxylic-acid, Phenyl-carbamate, Phenylpyrazoline 'DEN', Phenylpyridazine, Phenyl urea, Phosphinic acids, Pyridine carboxylic acid, Pyridinecarboxamide, Sulfonylaminocarbonyltriazolinone, Sulfonylurea, Thiocarbamate, Triazine, Triazinone, Triazolinone, Triazolone, Triazolopyrimidine, Triketone, or Uracil.

8. The formulation according to claim 6, characterized in that, the herbicide is selected from a group comprising: 2,4-D, Acetic acid, Amidosulfuron, Aminopyralid, Bentazone, Carfentrazone-ethyl, Capric acid, Caprylic acid, Clethodim, Clodinafop, Cyhalofop-butyl, Cyclanilide, Dicamba, Dichlorprop-P, Diflufenican, Diquat, Dimethenamid-P, Endothall, Ethofumesate, Fatty acids C7 to C20, Fatty acids C7-C18 and C18 unsaturated potassium salts, Fatty acids C8-C10 methyl esters, Fenoxaprop-P, Flazasulfuron, Florasulam, Flufenacet (formerly fluthiamide), Fluroxypyr, Foramsulfuron, Glufosinate, Glyphosate, Imazamox, lodosulfuron, Isoxaflutole, MCPA, Mesosulfuron, Mesotrione, Metamitron, Metazachlor, Metribuzin, Metsulfuron-methyl, Nicosulfuron, Oleic acid, Oryzalin, Oxyfluorfen, Paraquat, Pelargonic acid, Pendimethalin, Penoxsulam, Pethoxamid, Phenmedipham, Picolinafen, Picloram, Pinoxaden, Propaquizafop, Propoxycarbazone, Propyzamide, Prosulfocarb, Pyraflufen-ethyl, Pyridate, Pyroxsulam, Rimsulfuron (renriduron), saflufenacil, S-Metolachlor, Sodium chlorate, Tembotrione, Terbuthylazine, Thidiazuron, Thiencarbazone-methyl, Thifensulfuron-methyl, Tribenuron (metometuron), Tribufos, Triclopyr, Triflusulfuron or salts thereof.

9. The formulation according to claim 6, characterized in that, the weight ratio of the herbicide to the polymer is between 1:5 and 100:1.

10. The formulation according to claim 1, characterized in that, the herbicide is a carboxylic acid and the weight ratio of the herbicide to the polymer of a hydroxycinnamic acid is between 1:1 and 300:1.

11. The formulation according to claim 1, characterized in that, the polymer is a polyferulate.

12. A method for controlling weeds or for aiding harvest, the method comprises: applying a herbicide at 2-98% of its recommended dose if applied alone, and applying 1 to 500 g polymers of a hydroxycinnamic acid/ha simultaneously with the herbicide or in a period of 10 days prior to or after applying the herbicide.

13. The method according to claim 12, applying the herbicide at 20-75% of its recommended dose if applied alone, and applying 10 to 25 g polymers of a hydroxycinnamic acid /ha simultaneously with the herbicide or in a period of 10 days prior to or after applying the herbicide.

14. The formulation according to claim 10, characterized in that, the herbicide is a pelargonic acid, acetic acid, capric acid, or caprylic acid.

15. The formulation according to claim 10, characterized in that, the weight ratio of the herbicide to the polymer of a hydroxycinnamic acid is between 8:1 and 100:1.

\* \* \* \* \*